(12) United States Patent
Uchiyama

(10) Patent No.: US 11,159,761 B2
(45) Date of Patent: Oct. 26, 2021

(54) VIDEO DISPLAY DEVICE AND VIDEO DISPLAY METHOD

(71) Applicant: Sharp NEC Display Solutions, Ltd., Tokyo (JP)

(72) Inventor: Akira Uchiyama, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/260,638

(22) PCT Filed: Jul. 18, 2018

(86) PCT No.: PCT/JP2018/026877
§ 371 (c)(1),
(2) Date: Jan. 15, 2021

(87) PCT Pub. No.: WO2020/016957
PCT Pub. Date: Jan. 23, 2020

(65) Prior Publication Data
US 2021/0281795 A1 Sep. 9, 2021

(51) Int. Cl.
*H04N 5/445* (2011.01)
*H04N 5/57* (2006.01)
*H04N 9/78* (2006.01)

(52) U.S. Cl.
CPC ........ *H04N 5/44504* (2013.01); *H04N 5/57* (2013.01); *H04N 9/78* (2013.01)

(58) Field of Classification Search
CPC ...... H04N 5/44504; H04N 5/445; H04N 5/50; H04N 5/57; H04N 9/78; H04N 9/76; H04N 9/74; G09G 5/02; G09G 5/00; G09G 5/10

(Continued)

(56) References Cited

U.S. PATENT DOCUMENTS

2006/0050178 A1 3/2006 Park et al.
2007/0120972 A1 5/2007 Kim et al.
(Continued)

FOREIGN PATENT DOCUMENTS

JP 2007-151125 A 6/2007
JP 2007-166456 A 6/2007
(Continued)

OTHER PUBLICATIONS

International Search Report (ISR) (PCT Form PCT/ISA/210), in PCT/JP2018/026877, dated Oct. 23, 2018.

*Primary Examiner* — Sherrie Hsia
(74) *Attorney, Agent, or Firm* — McGinn IP Law Group, PLLC

(57) ABSTRACT

A video display device that acquires video information including various signals required to display a video from an external device and displays a video based on the video information on a display screen includes: an operation receiving unit configured to receive an operation; an extraction unit configured to extract a signal of which a change in a signal value before and after the video information has changed is greater than a threshold value out of the various signals in case that the video information has changed and the operation is received by the operation receiving unit; an identification unit configured to identify an adjustment item of the display screen corresponding to the signal extracted by the extraction unit; and an adjustment unit configured to adjust a set value of the adjustment item identified by the identification unit.

10 Claims, 8 Drawing Sheets

(58) Field of Classification Search
USPC ....... 348/563, 564, 566, 569, 598, 599, 687; 382/254, 274, 270
See application file for complete search history.

(56) References Cited

U.S. PATENT DOCUMENTS

2007/0140578 A1      6/2007  Okutsu
2008/0123985 A1*    5/2008  Fujibayashi ............ G06T 7/223
                                                                            382/254

FOREIGN PATENT DOCUMENTS

JP          2015-125346 A      7/2015
WO    WO 2013/080752 A1    6/2013

* cited by examiner

VIDEO DISPLAY DEVICE AND VIDEO DISPLAY METHOD

TECHNICAL FIELD

The present invention relates to a video display device and a video display method.

BACKGROUND ART

Patent Literature 1 discloses a video display device that displays a video on a display screen on the basis of video information which is input from an external device.

In such a video display device, in case that video information input from an external device changes and a user feels dissatisfied with a video after the video information has changed, the user needs to operate buttons or the like on a main body of the video display device and adjust items which can be adjusted in association with the display screen (hereinafter referred to as "adjustment items").

CITATION LIST

Patent Literature

[Patent Literature 1]
Japanese Unexamined Patent Application, First Publication No. 2007-151125

SUMMARY OF INVENTION

Technical Problem

However, a user may not be able to determine what adjustment item to adjust and thus it may be difficult to perform optimal adjustment.

The invention was made in consideration of the aforementioned circumstances and an objective thereof is to perform optimal adjustment of a display screen.

Solution to Problem

One aspect of the present invention is a video display device that acquires video information including various signals required to display a video from an external device and displays a video based on the video information on a display screen, the video display device including: an operation receiving unit configured to receive an operation; an extraction unit configured to extract a signal of which a change in a signal value before and after the video information has changed is greater than a threshold value out of the various signals in case that the video information has changed and the operation is received by the operation receiving unit; an identification unit configured to identify an adjustment item of the display screen corresponding to the signal extracted by the extraction unit; and an adjustment unit configured to adjust a set value of the adjustment item identified by the identification unit.

One aspect of the present invention is the above-described video display device, wherein the extraction unit extracts a signal of which the change before and after the video information has changed is greater than the threshold value and which is the greatest out of the various signals.

One aspect of the present invention is the above-described video display device, the video display device further including: a classification unit configured to classify a signal affecting brightness of the display screen into a first group and to classify a signal affecting color of a video into a second group out of the various signals, wherein the extraction unit extracts a signal in which the change is the greatest in each group.

One aspect of the present invention is the above-described video display device, wherein the extraction unit extracts a signal of which the change in signal value before and after the video information has changed is greater than a threshold value out of the various signals in case that the operation has been received by the operation receiving unit after the video information has changed.

One aspect of the present invention is the above-described video display device, the video display device further including: a storage unit; and a signal processing unit configured to store the pre-change video information in the storage unit and to display the post-change video information on the display screen in case that the video information has changed, wherein the extraction unit extracts a signal of which a change in signal value between the pre-change video information stored in the storage unit and the video information displayed on the display screen is greater than a threshold value out of the various signals in case that the operation has been received by the operation receiving unit.

One aspect of the present invention is the above-described video display device, the video display device further including: a storage unit; and a signal processing unit configured to store the pre-change video information and the post-change video information in the storage unit in case that the video information has changed, wherein the extraction unit extracts a signal of which a change in a signal value between the pre-change video information and the post-change video information stored in the storage unit is greater than a threshold value out of the various signals in case that the operation has been received by the operation receiving unit.

One aspect of the present invention is the above-described video display device, wherein the adjustment unit adjusts the set value of the adjustment item identified by the identification unit on the basis of a change ratio of the signal extracted by the extraction unit.

One aspect of the present invention is the above-described video display device, the video display device further including: a display control unit configured to display a selection screen for selecting one of a first direction in which the set value increases and a second direction in which the set value decreases on the display screen, wherein the adjustment unit adjusts the set value in the direction selected on the selection screen.

One aspect of the present invention is the above-described video display device, wherein the adjustment unit adjusts the set value by multiplying the set value by a value obtained by adding a plus sign to a change ratio of the signal extracted by the extraction unit in case that the direction selected on the selection screen is the first direction and multiplying the set value by a value obtained by adding a minus sign to the change ratio in case that the direction selected on the selection screen is the second direction.

One aspect of the present invention is a video display method of acquiring video information including various signals required to display a video from an external device and displaying a video based on the video information on a display screen of a video display device, the video display method including: an operation receiving step of receiving an operation; an extraction step of extracting a signal of which a change in a signal value before and after the video information has changed is greater than a threshold value out of the various signals in case that the video information has changed and the operation is received in the operation receiving step; an identification step of identifying an adjustment item of the display screen corresponding to the signal extracted in the extraction step; and an adjustment step of adjusting a set value of the adjustment item identified in the identification step.

Advantageous Effects of Invention

As described above, according to the invention, it is possible to perform optimal adjustment of a display screen.

DESCRIPTION OF EMBODIMENTS

Hereinafter, a video display device according to an embodiment of the invention will be described with reference to the accompanying drawings.

First Embodiment

Figure 1:
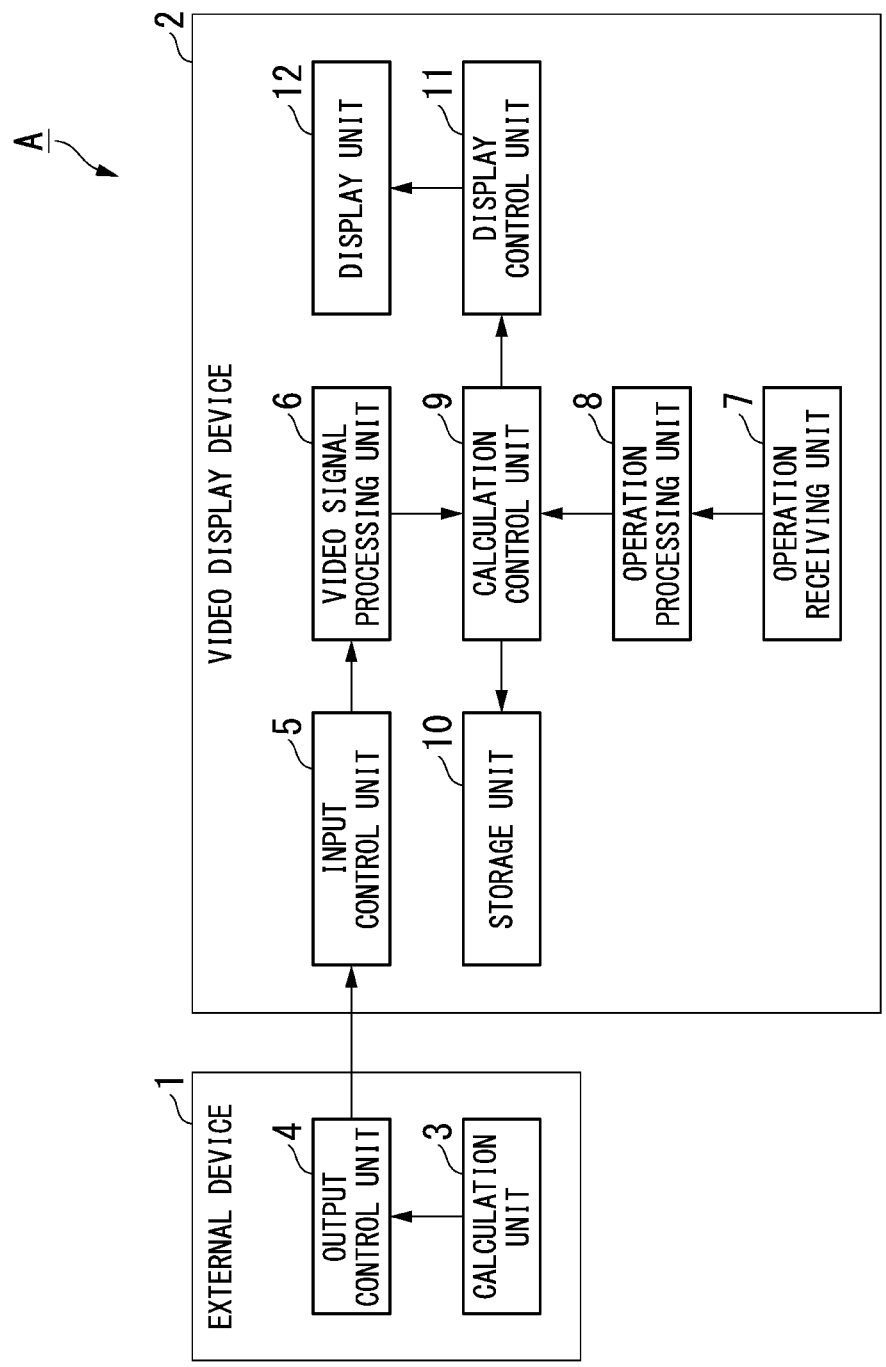
FIG. 1 is a diagram schematically illustrating an example of a configuration of a video display system A including a video display device according to a first embodiment.

FIG. 1 is a diagram schematically illustrating an example of a configuration of a video display system A including a video display device according to a first embodiment. As illustrated in FIG. 1, the video display system A includes an external device 1 and a video display device 2.

The external device is, for example, a personal computer (PC), and is connected to the video display device 2 in a wired or wireless manner. The external device 1 outputs a video signal to the video display device 2 in a wired or wireless manner. A video signal includes various signals required to display a video on a display screen of the video display device 2. For example, the video signal includes video information such as a luminance signal indicating a luminance level or a chromaticity signal indicating a chromaticity level.

More specifically, the external device 1 includes a calculation unit 3 and an output control unit 4.

The calculation unit 3 generates a video signal on the basis of video information displayed on the display screen of the video display device 2 and outputs the generated video signal to the output control unit 4.

The output control unit 4 outputs the video signal generated by the calculation unit 3 to the video display device 2. For example, the output control unit 4 transmits (outputs) the video signal to the video display device 2 after performing a standby process for transmitting the video signal generated by the calculation unit 3 to the video display device 2.

The video display device 2 displays a video based on the video signal transmitted from the output control unit 4 on a display screen thereof. The configuration of the video display device 2 according to an embodiment of the invention will be schematically described below.

The video display device 2 includes an input control unit 5, a video signal processing unit 6, an operation receiving unit 7, an operation processing unit 8, a calculation control unit 9, a storage unit 10, a display control unit 11, and a display unit 12.

The input control unit 5 acquires the video signal transmitted from the output control unit 4 and inputs the acquired video signal to the video signal processing unit 6.

The video signal processing unit 6 analyzes the video signal input from the input control unit 5 and transmits a result of analysis thereof to the calculation control unit 9. For example, the video signal processing unit 6 extracts video information, that is, signal values of various signals, included in the video signal by analyzing the video signal input from the input control unit 5. For example, the video signal processing unit 6 extracts a luminance level which is a signal value of a luminance signal included in the video signal or a chromaticity level which is a signal value of a chromaticity signal included in the video signal as video information. Then, the video signal processing unit 6 outputs the extracted video information to the calculation control unit 9.

The operation receiving unit 7 receives an operation on the video display device 2. This operation is an operation associated with automatic adjustment of the display screen of the video display device 2 and is, for example, an operation which is performed by a user. In this embodiment, the operation receiving unit 7 is an interface for allowing a user to adjust the display screen of the video display device 2. For example, the operation receiving unit 7 includes an operation unit such as a plurality of buttons or a touch panel and receives a user's operation by detecting that the operation unit has been operated by a user. The operation receiving unit 7 may include a communication unit and the communication unit may receive a user's operation by receiving a signal indicating an operation associated with adjustment of the display screen of the video display device 2 from the outside in a wired or wireless manner.

The operation processing unit 8 analyzes details of the user's operation received by the operation receiving unit 7 (hereinafter referred to as "user's operation details") and transmits the result of analysis to the calculation control unit 9. For example, the user's operation details include instructing automatic adjustment of the display screen of the video display device 2, instructing the automatic adjustment in a plus direction (a first direction), and instructing the automatic adjustment in a minus direction (a second direction).

The calculation control unit 9 displays a video based on the video information on the display screen by acquiring the video information from the video signal processing unit 6 and transmitting the acquired video information to the display control unit 11. In case that new video information is input to the calculation control unit 9 by inputting a new video signal to the video display device 2, the calculation control unit 9 stores current video information displayed on the display screen in the storage unit 10. Then, the calculation control unit 9 displays a video based on the newly input video information on the display screen by transmitting the newly input video information to the display control unit 11 after storing the current video information in the storage unit 10. In case that the current video information and the newly input video information are the same and there is no change in the video information, the current video information may not be stored in the storage unit 10.

Here, in case that a user's operation is received by the operation receiving unit 7 after video information having a difference from the current video information has been newly input, the calculation control unit 9 automatically performs optimal adjustment of the display screen of the video display device 2 in consideration of the user's operation details.

Figure 2:
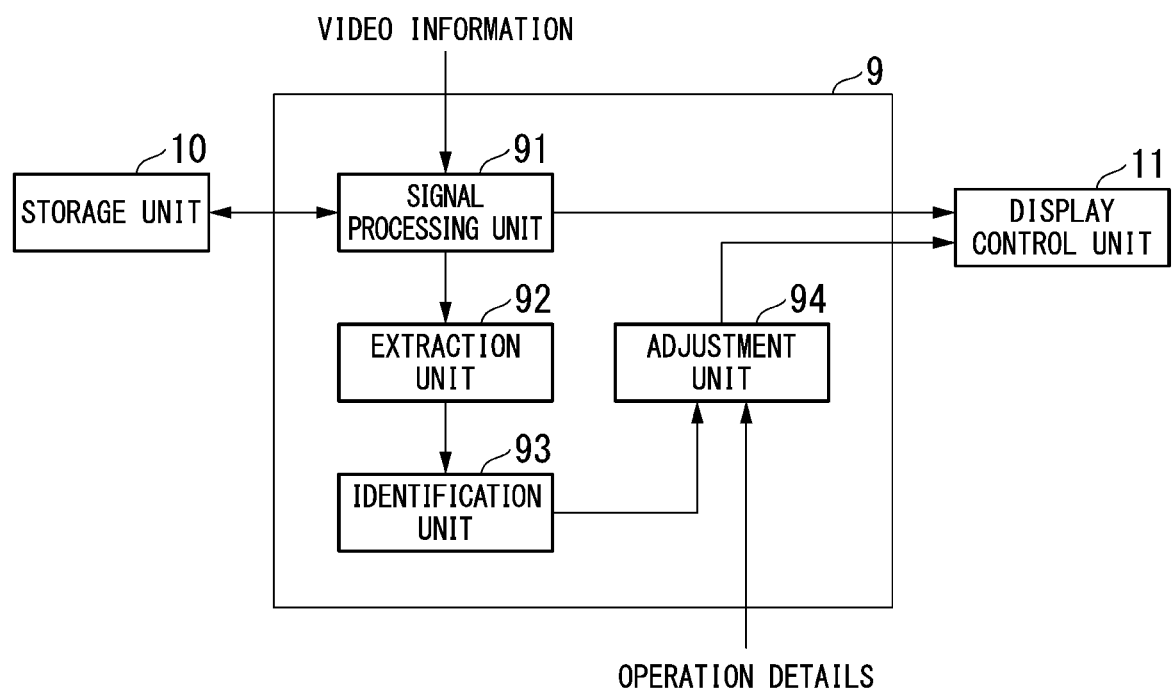
FIG. 2 is a functional block diagram illustrating a display screen adjusting function of a calculation control unit 9 according to the first embodiment.

A method of adjusting the display screen in the video display device 2 according to the first embodiment will be described below. FIG. 2 is a functional block diagram illustrating a display screen adjusting function of the calculation control unit 9 according to the first embodiment.

As illustrated in FIG. 2, the calculation control unit 9 includes a signal processing unit 91, an extraction unit 92, an identification unit 93, and an adjustment unit 94.

In case that newly input video information is different from current video information, the signal processing unit 91 stores the current video information in the storage unit 10 and transmits the newly input video information to the display control unit 11 such that the newly input video information is displayed on the display screen.

Here, in case that a user's operation is received by the operation receiving unit 7 in a state in which the newly input video information is displayed on the display screen, the signal processing unit 91 compares the newly input video information (that is, the video information displayed on the display screen) with the video information stored in the storage unit 10, and calculates change ratios $\Delta H$ in signal values of various signals included in the video information. A change ratio $\Delta H$ indicates to what extent a signal value has changed in case that the video information has changed and is, for example, a ratio in a range of 0% to 100%.

The extraction unit 92 determines whether there is a change ratio $\Delta H$ which is greater than a predetermined threshold value out of the change ratios $\Delta H$ of the signals extracted by the signal processing unit 91, and extracts the signal of the change ratio $\Delta H$ in case that it is determined that there is a change ratio $\Delta H$ greater than the threshold value. That is, the extraction unit 92 extracts a signal of which a change ratio $\Delta H$ before and after the video information has changed is greater than the threshold value out of various signals.

In case that there are a plurality of signals of which the change ratio $\Delta H$ in the signal value is greater than the predetermined threshold value, the extraction unit 92 may extract all the signals of which the change ratio $\Delta H$ is greater than a predetermined threshold value or may extract a signal of which the change ratio $\Delta H$ is the highest out of the plurality of signals of which the change ratio $\Delta H$ is greater than the predetermined threshold value. In case that there are a plurality of signals of which the change ratio $\Delta H$ in the signal value is greater than the predetermined threshold value, the extraction unit 92 may extract a one or more arbitrary signals out of the plurality of signals of which the change ratio $\Delta H$ is greater than the predetermined threshold value.

The identification unit 93 identifies an adjustment item of the display screen corresponding to the signal extracted by the extraction unit 92. Here, an adjustment item indicates an item which can be adjusted on the display screen and examples thereof include contrast, brightness, color depth, tone, and image quality. The identification unit 93 outputs the identified adjustment item to the adjustment unit 94.

The adjustment unit 94 acquires a current set value S in the adjustment item identified by the identification unit 93.

In case that a user's operation details indicating that "an adjustment direction of the display screen is a plus direction" have been acquired from the operation processing unit 8, the adjustment unit 94 adds a plus sign to the change ratio $\Delta H$ of the signal extracted by the extraction unit 92. In case that a user's operation details indicating that "an adjustment direction of the display screen is a minus direction" have been acquired from the operation processing unit 8, the adjustment unit 94 adds a minus sign to the change ratio $\Delta H$ of the signal extracted by the extraction unit 92.

After a sign has been added to the change ratio $\Delta H$, the adjustment unit 94 calculates an adjustment value by multiplying the previously acquired set value S by the change ratio $\Delta H$ with a sign added thereto. Then, the adjustment unit 94 transmits the calculated adjustment value to the display unit 12, whereby the current set value of the display screen is updated with the adjustment value. That is, the adjustment unit 94 adjusts the set value S on the basis of the adjustment value obtained by multiplying the previously acquired set value S by the change ratio with a sign added thereto.

The display control unit 11 acquires the video information transmitted from the calculation control unit 9 and displays a video based on the video information on the display unit 12. The display control unit 11 displays a selection screen for allowing a user to select one of the plus direction and the minus direction as the adjustment direction on the display screen.

The display control unit 11 updates the current set value S in the adjustment item identified by the identification unit 93 on the basis of the adjustment value transmitted from the adjustment unit 94.

The display unit 12 is the display screen of the video display device 2 and is, for example, a liquid crystal display (LCD) or an electroluminescence (EL) panel.

Figure 3:
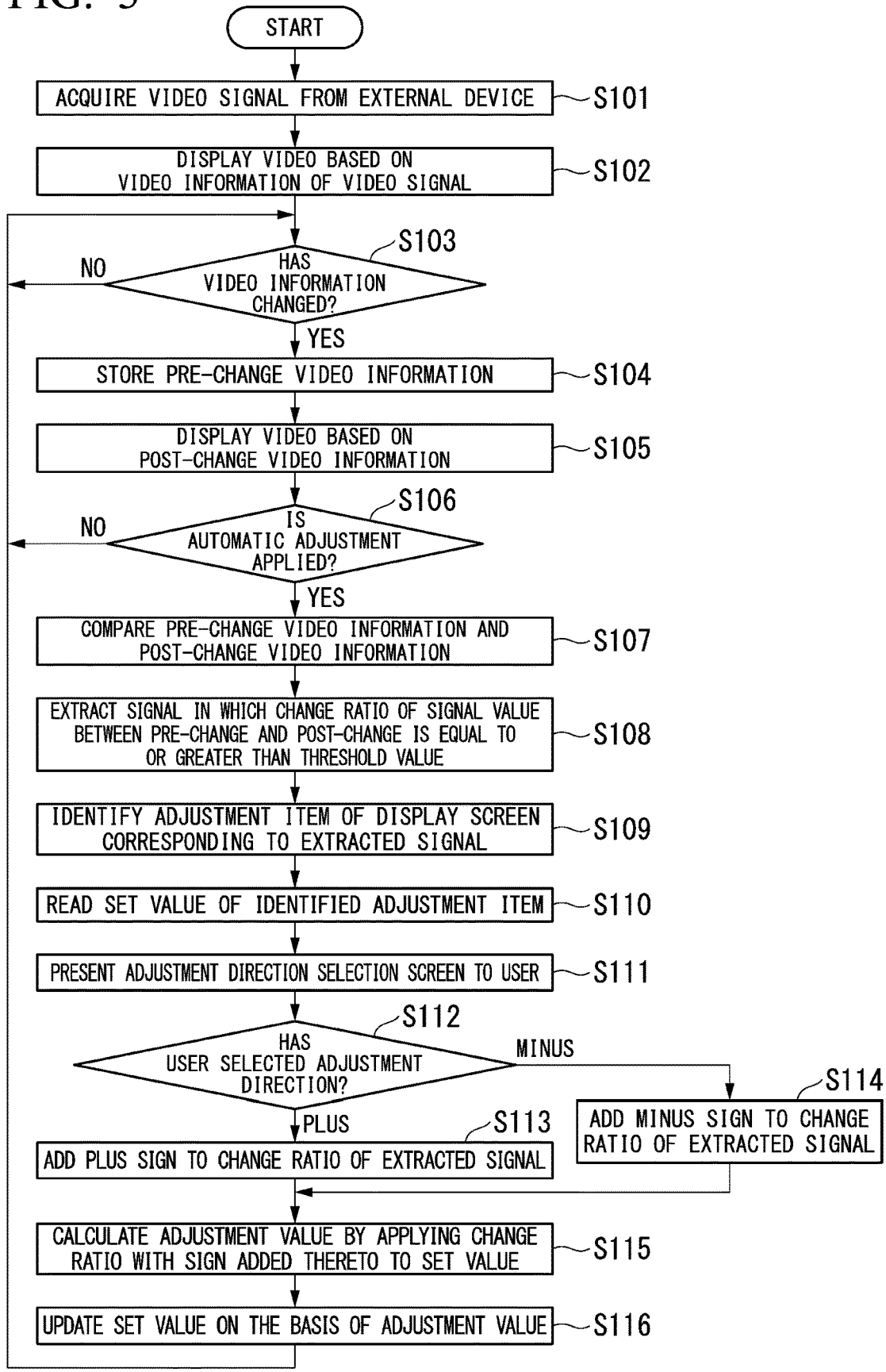
FIG. 3 is a diagram illustrating a flow of operations of a video display device 2 according to the first embodiment.

Operations of the video display device 2 according to the first embodiment will be described below with reference to FIG. 3. FIG. 3 is a diagram illustrating operations of the video display device 2 according to the first embodiment.

The video display device 2 acquires a video signal input from the external device 1 (Step S101). Then, the video display device 2 analyzes the acquired video signal and displays a video based on video information acquired from the result of analysis on the display screen (Step S102).

Here, the signal processing unit 91 of the video display device 2 determines whether a video signal has been newly input from the external device 1 and whether video information of the video signal (new video information) has changed from the current video information (Step S103), and stores the current video information in case that it is determined that the video information has changed. Then, the signal processing unit 91 displays a video based on the new video information on the display screen. That is, in case that the video information has changed, the signal processing unit 91 stores the pre-change video information in the storage unit 10 (Step S104) and displays the post-change video information on the display screen (Step S105).

Then, the signal processing unit 91 determines whether automatic adjustment of the display unit 12 has to be applied (Step S106). The case in which automatic adjustment of the display unit 12 has to be applied is, for example, a case in which a user feels dissatisfied with the video (for example, brightness or chromaticity) currently displayed on the display screen and wants to change the video.

Specifically, for example, a user displays a menu screen for selecting automatic adjustment on the display unit 12 by operating an operation unit such as buttons or a mouse provided in the video display device 2. In case that the user performs an operation of selecting the automatic adjustment of the display unit 12 on the menu screen, the operation receiving unit 7 determines that the automatic adjustment of the display screen (the display unit 12) has to be applied by receiving the operation.

In case that it is determined that the automatic adjustment of the display screen (the display unit 12) has to be applied, the signal processing unit 91 compares the pre-change video information (that is, the video information stored in the storage unit) with the post-change video information (for example, the video information displayed on the display unit 12) (Step $S_{107}$). Then, the video display device 2 extracts a signal of which the change ratio $\Delta H$ in the signal value is greater than a threshold value as the result of comparison (Step $S_{108}$). For example, the extraction unit 92 of the video display device 2 creates a graph of the change ratios of the signals in case that the pre-change video information has become the post-change video information. Then, the extraction unit 92 extracts a signal of which the change ratio is greater than a predetermined threshold value. Here, the video display device 2 determines that the change of the signal extracted by the extraction unit 92 before and after the video information has changed is a reason for the user's discomfort.

The identification unit 93 identifies an adjustment item of the display screen corresponding to the signal extracted by the extraction unit 92 (Step S109). Then, the adjustment unit 94 reads a current set value S in the adjustment item identified by the identification unit 93 (Step S110). Examples of the adjustment item in this embodiment include contrast, brightness, color depth, tone, and image quality.

Here, the video display device 2 allows a user to select to which of the plus direction and the minus direction the adjustment direction of the display screen is set. For example, the display control unit 11 of the video display device 2 displays a selection screen for selecting to which of the plus direction and the minus direction the adjustment direction of the display screen is set on the display screen (Step S111). The selection screen in this embodiment is preferably the same GUI as the menu screen for selecting automatic adjustment in Step S106.

Accordingly, the user can select the adjustment direction of the display screen from the selection screen by operating an operation unit such as a pointing device like a mouse, or a button (Step S112).

For example, it is assumed that a user feels dissatisfied with a decrease in brightness, that is, darkening, due to change of the video information displayed on the display screen of the video display device 2 and selects the automatic adjustment. In this case, the user can select the user's desired adjustment direction by selecting a direction in which brightness is increased, that is, the plus direction, in Step S112. On the other hand, it is assumed that the user feels dissatisfied with excessive brightness of the display screen by change of the video information displayed on the display screen of the video display device 2 and selects the automatic adjustment. In this case, the user can select the user's desired adjustment direction by selecting a direction in which brightness is decreased, that is, the minus direction, in Step S112. An example in which the user feels uncomfortable about brightness has been described above, but the invention is not limited thereto and the same is true in case that the user feels uncomfortable about contrast, chromaticity, or the like.

There may be a user who does not know a specific adjustment item such as contrast or chromaticity which is the reason for the user's discomfort about a video on the display screen due to change of the video information displayed on the display screen. Accordingly, in this embodiment, the user is not allowed to select an adjustment item but is allowed to select only the adjustment direction. That is, for the current video, the user is allowed only to select the plus direction in which a set value of a certain adjustment item is increased or the minus direction in which the set value of the certain adjustment item is decreased. Accordingly, the user can perform optimal adjustment for the display screen by only intuitively selecting the adjustment direction without determining what adjustment item is to be adjusted.

In case that the plus direction is selected as the adjustment direction of the display screen by a user, the adjustment unit 94 adds a plus sign to the change ratio $\Delta H$ of the signal extracted by the extraction unit 92 (Step S113). On the other hand, in case that the minus direction is selected as the adjustment direction of the display screen, the adjustment unit 94 adds a minus sign to the change ratio $\Delta H$ of the signal extracted by the extraction unit 92 (Step S114).

After adding the plus or minus sign to the change ratio $\Delta H$, the adjustment unit 94 calculates an adjustment value by multiplying the previously acquired set value S by the change ratio $\Delta H$ with a sign added thereto (Step S115). Then, the adjustment unit 94 transmits the calculated adjustment value to the display unit 12. Accordingly, the current set value S of the display screen is updated (Step S116). For example, in case that the change ratio $\Delta H$ is 40%, the set value S is 20, and the plus direction is selected as the adjustment direction of the display screen by a user, the adjustment unit 94 acquires the adjustment value "28" (=20×1.4) by increasing the set value "20" by +40%. Then, the adjustment unit 94 transmits the adjustment value "28" to the display control unit 11. Accordingly, the display control unit 11 updates the adjustment value "28" as a new set value S. That is, the adjustment unit 94 adjusts the set values of the adjustment items of the display screen. Then, in case that the set value S is updated, the flow of operations returns to Step S103.

In this way, in case that a user wants to change brightness or chromaticity of a video currently displayed on the display screen and performs selection of the automatic adjustment from the adjustment screen (the menu screen) of the display screen and selection of one of the plus direction and the minus direction as the adjustment direction of the screen, the video display device 2 dynamically adjusts the set value of the screen corresponding to a signal the change of which has most affected the user. That is, in case that a user feels uncomfortable due to change of video information and thus selects the automatic adjustment, the video display device 2 determines a signal of which the change ratio before and after video information has changed is greater than a threshold value or a signal of which the change ratio is greater than the threshold value and which has the highest change ratio as the reason for the user's discomfort, and dynamically adjusts an amount of change thereof. Accordingly, a user does not need to determine an adjustment item that he or she wants to be adjusted or a set value of the adjustment item. As a result, it is possible to perform optimal adjustment of a display screen.

Second Embodiment

A video display device 2B according to a second embodiment will be described below. The video display device 2B according to the second embodiment is different from that of the first embodiment in that various signals included in video information are classified into a plurality of groups and a signal of which the change ratio ΔH is the highest in each group is extracted in the method of adjusting the display screen in the video display device 2, and is the same as that of the first embodiment in other configurations. In the drawings, the same or similar units will be referred to by the same reference signs and description thereof will not be repeated.

Figure 4:
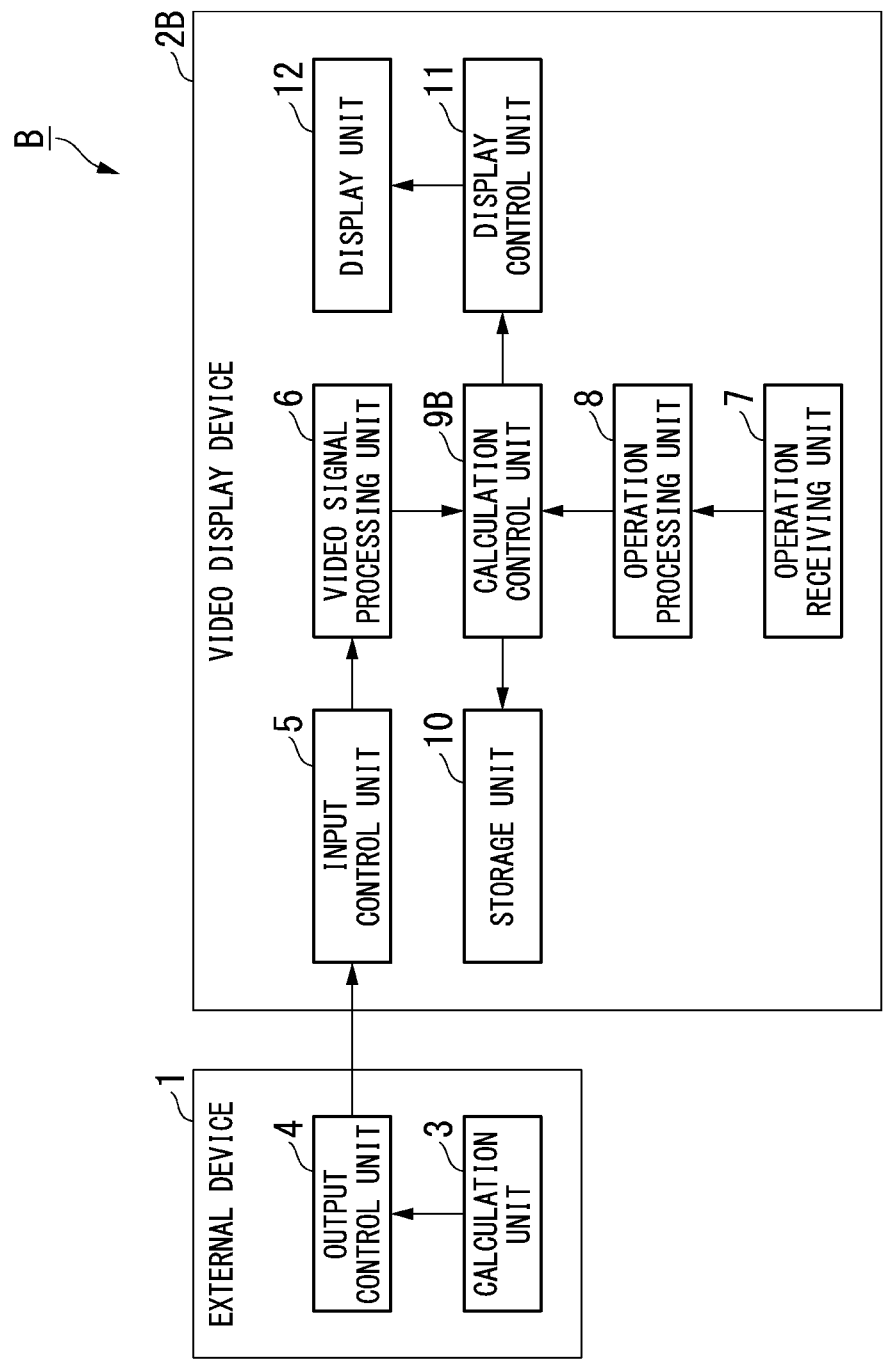
FIG. 4 is a diagram schematically illustrating an example of a configuration of a video display system B including a video display device according to a second embodiment.

FIG. 4 is a diagram schematically illustrating an example of a configuration of a video display system B including a video display device according to the second embodiment. As illustrated in FIG. 4, the video display system B includes an external device 1 and a video display device 2B.

The video display device 2B displays a video based on a video signal transmitted from the external device 1 on a display screen thereof. The configuration of the video display device 2B according to the second embodiment of the invention will be schematically described below.

The video display device 2B includes an input control unit 5, a video signal processing unit 6, an operation receiving unit 7, an operation processing unit 8, a calculation control unit 9B, a storage unit 10, a display control unit 11, and a display unit 12.

The calculation control unit 9B displays a video based on the video information on the display screen by acquiring the video information from the video signal processing unit 6 and transmitting the acquired video information to the display control unit 11. In case that new video information is input to the calculation control unit 9B by inputting a new video signal to the video display device 2B, the calculation control unit 9B stores current video information displayed on the display screen in the storage unit 10. Then, the calculation control unit 9B displays a video based on the newly input video information on the display screen by transmitting the newly input video information to the display control unit 11 after storing the current video information in the storage unit 10. Similarly to the first embodiment, in case that the current video information and the newly input video information are the same and there is no change in video information, the current video information may not be stored in the storage unit 10.

Here, in case that a user's operation is received by the operation receiving unit 7 after video information having a difference from the current video information has been newly input, the calculation control unit 9B automatically performs optimal adjustment of the display screen of the video display device 2B in consideration of the user's operation details.

Figure 5:
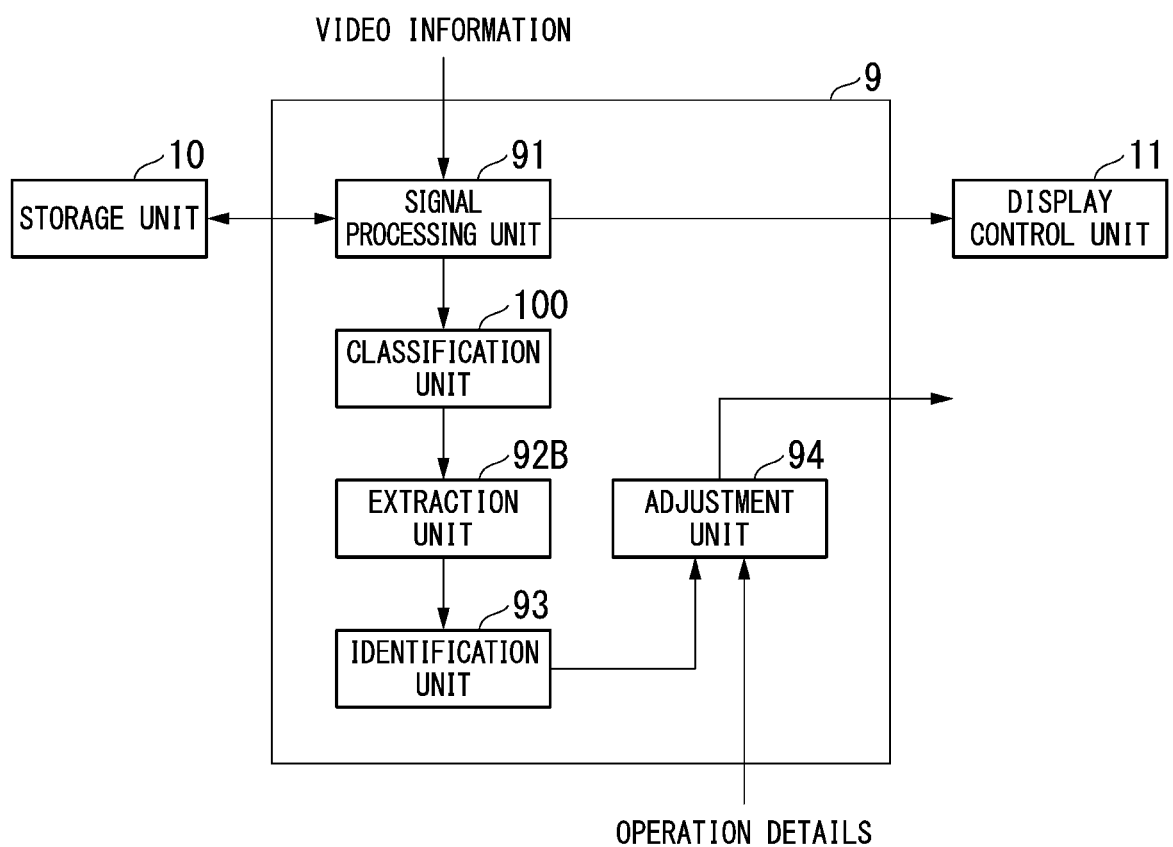
FIG. 5 is a functional block diagram illustrating a display screen adjusting function of a calculation control unit 9 according to the second embodiment.

A method of adjusting the display screen in the video display device 2B according to the second embodiment will be described below. FIG. 5 is a functional block diagram illustrating a display screen adjusting function of the calculation control unit 9B according to the second embodiment.

As illustrated in FIG. 5, the calculation control unit 9B includes a signal processing unit 91, a classification unit 100, an extraction unit 92B, an identification unit 93, and an adjustment unit 94.

In case that a change ratio ΔH of each signal is calculated by the signal processing unit 91, the classification unit 100 classifies a signal affecting brightness of the display screen out of various signals included in video information into a first group and classifies a signal affecting color of a video into a second group.

The extraction unit 92B extracts a signal of which the change ratio ΔH is equal to or greater than a threshold value and is the highest in each group classified by the classification unit 100.

The identification unit 93 identifies adjustment items of the display screen corresponding to the signals extracted from the first group and the second group by the extraction unit 92. The identification unit 93 outputs the two identified adjustment items to the adjustment unit 94.

The adjustment unit 94 acquires current set values $S_1$ and $S_2$ in the adjustment items identified by the identification unit 93. In case that a user's operation details indicating that "an adjustment direction of the display screen is a plus direction" have been acquired from the operation processing unit 8, the adjustment unit 94 adds a plus sign to the change ratios ΔH of the signals extracted by the extraction unit 92. In case that a user's operation details indicating that "an adjustment direction of the display screen is a minus direction" have been acquired from the operation processing unit 8, the adjustment unit 94 adds a minus sign to the change ratios ΔH of the signals extracted by the extraction unit 92. After a sign has been added to the change ratios ΔH, the adjustment unit 94 calculates adjustment values by multiplying the previously acquired set values $S_1$ and $S_2$ by the change ratios ΔH with a sign added thereto, and transmits the calculated adjustment values to the display control unit 11.

Figure 6:
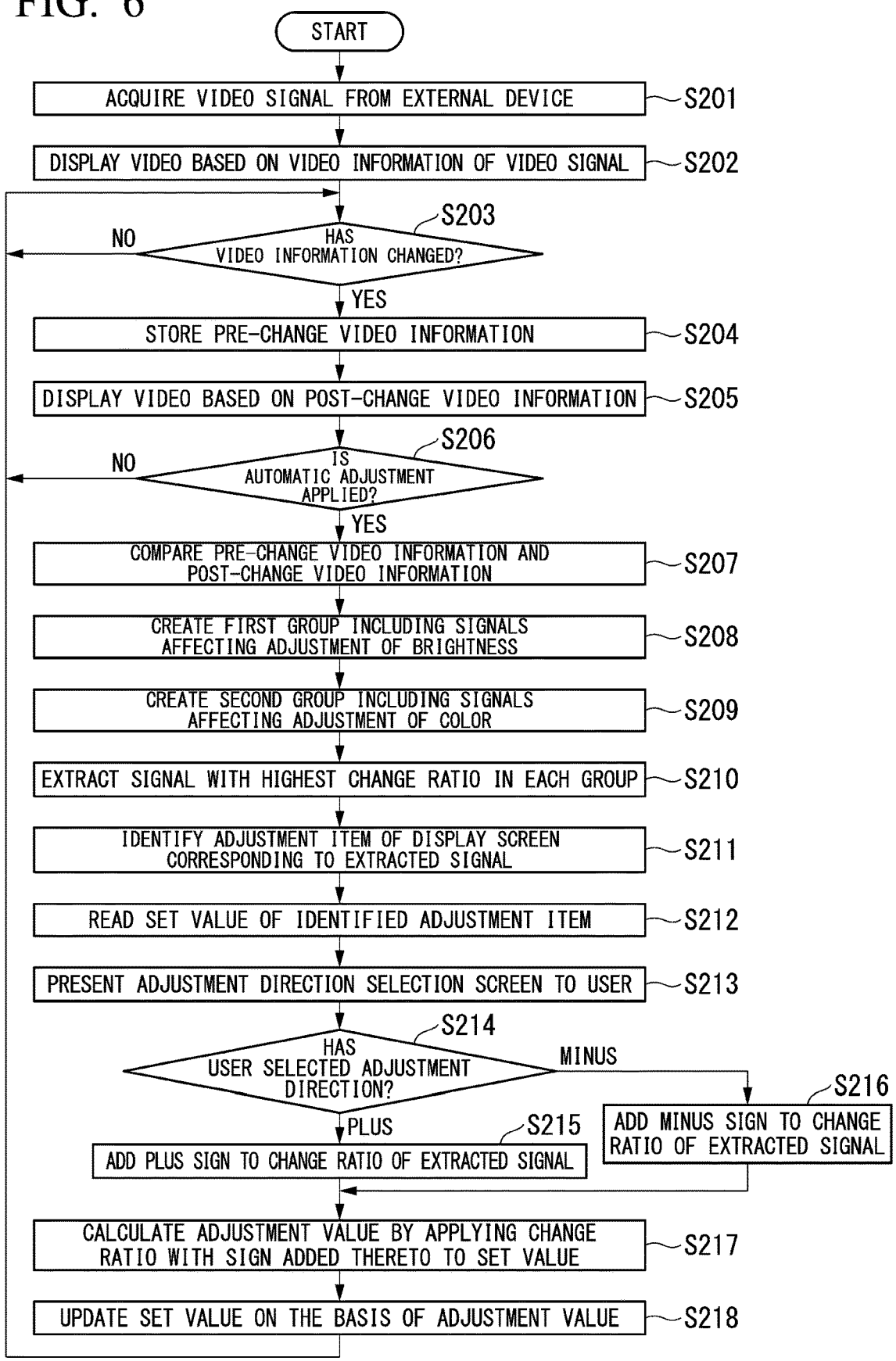
FIG. 6 is a diagram illustrating a flow of operations of a video display device 2B according to the second embodiment.

Operations of the video display device 2B according to the second embodiment will be described below with reference to FIG. 6. FIG. 6 is a diagram illustrating operations of the video display device 2B according to the second embodiment.

The video display device 2B acquires a video signal input from the external device 1 (Step $S_{201}$). Then, the video display device 2B analyzes the acquired video signal and displays a video based on video information acquired from the result of analysis on the display screen (Step $S_{202}$).

Here, the video display device 2B determines whether a video signal has been newly input from the external device 1 and whether video information of the video signal (new video information) has changed from the current video information (Step S203), and stores the current video information in case that it is determined that the video information has changed. Then, the video display device 2B displays a video based on the new video information on the display screen. That is, in case that the video information has changed, the video display device 2B stores the pre-change video information in the storage unit 10 (Step S204) and displays the post-change video information on the display screen (Step S205).

Then, similarly to the process of Step S106 in the first embodiment, the video display device 2B determines whether automatic adjustment of the display unit 12 has to be applied (Step S206).

In case that it is determined that the automatic adjustment of the display screen (the display unit 12) has to be applied, the video display device 2B compares the pre-change video information (that is, the video information stored in the storage unit) with the post-change video information (for example, the video information displayed on the display unit 12) (Step $S_{207}$). Then, the video display device 2B calculates signals of which the change ratios ΔH in signal value of various signals included in the video information.

In case that the change ratio ΔH in signal value is calculated for each signal, the classification unit 100 classifies a signal affecting brightness of the display screen into the first group (Step S208) and classifies a signal affecting color thereof into the second group (Step S209). Then, the extraction unit 92B extracts a signal having the highest change ratio ΔH in each group (Step S210). The signal extracted by the extraction unit 92B is determined to be the reason why a user adjusted the display screen.

The identification unit 93 identifies adjustment items of the display screen corresponding to the signals extracted by the extraction unit 92 (Step S211). Then, the adjustment unit 94 reads current set values $S_1$ and $S_2$ in the adjustment items identified by the identification unit 93 (Step S212). Here, the change ratio ΔH of the signal extracted from the first group is defined as $ΔH_1$, and the set value of the adjustment item corresponding to the signal is defined as a set value $S_1$. The change ratio ΔH of the signal extracted from the second group is defined as $ΔH_2$, and the set value of the adjustment item corresponding to the signal is defined as a set value $S_2$.

The video display device 2B displays a selection screen for selecting to which of the plus direction and the minus direction the adjustment direction of the display screen is set on the display screen (Step S213). The selection screen in this embodiment is preferably the same GUI as the menu screen for selecting automatic adjustment in Step S206. Accordingly, the user can select the adjustment direction of the display screen from the selection screen by operating an operation unit such as a pointing device like a mouse, a button (Step S214).

In case that the plus direction is selected as the adjustment direction of the display screen by a user, the adjustment unit 94 adds a plus sign to the change ratio $ΔH_1$ and the change ratio $ΔH_2$ (Step S215). On the other hand, in case that the minus direction is selected as the adjustment direction of the display screen, the adjustment unit 94 adds a minus sign to the change ratio $ΔH_1$ and the change ratio $ΔH_2$ (Step S216).

After adding the plus or minus sign to the change ratio $ΔH_1$ and the change ratio $ΔH_2$, the adjustment unit 94 calculates adjustment values of the adjustment items by multiplying the previously acquired set value $S_1$ by the change ratio $ΔH_1$ with a sign added thereto and multiplying the set value $S_2$ by the change ratio $ΔH_2$ with a sign added thereto (Step S217). Then, the adjustment unit 94 transmits the calculated adjustment values to the display unit 12. Accordingly, the current set values $S_1$ and $S_2$ of the display screen are updated (Step S218).

Examples of the second embodiment will be described below.

For example, in case that a video currently displayed on the display unit 12 of the video display device 2B is switched from a video X to a video Y by allowing a user to operate the external device 1 (for example, a PC), the calculation control unit 9B of the video display device 2B stores a video signal (video information) of the video X in the storage unit 10 and displays the video Y on the basis of the newly input video signal (video information).

Here, it is assumed that the user feels uncomfortable about the video Y and settings of the display screen on which the video is displayed and tries to perform adjustment. Since there are many types of adjustment items of the display screen of the video display device 2B and the user cannot identify adjustment items which are desired by the user, the user selects automatic adjustment and selects the plus direction as the adjustment direction.

In this case, the signal processing unit 91 of the video display device 2B compares the signals in the video information of the videos X and Y and calculates the change ratios ΔH of the signals at the time of automatic adjustment. Here, the classification unit 100 classifies a signal affecting brightness of the displayed video into the first group and classifies a signal affecting color into the second group. Accordingly, for example, the extraction unit 92B creates a graph of the change ratios ΔH of the signals in the first group before and after the signals have changed (for example, FIG. 7), and creates a graph of the change ratios ΔH of the signals in the second group (for example, FIG. 8).

Figure 7:
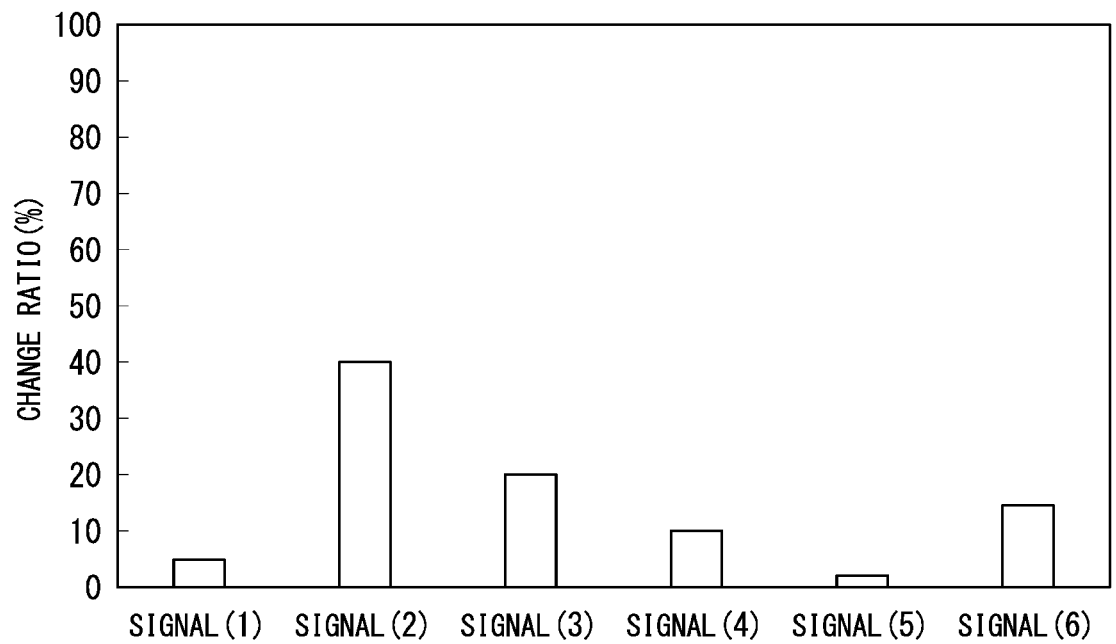
FIG. 7 is a diagram illustrating an example of change ratios of signals in a first group according to the second embodiment.
Figure 8:
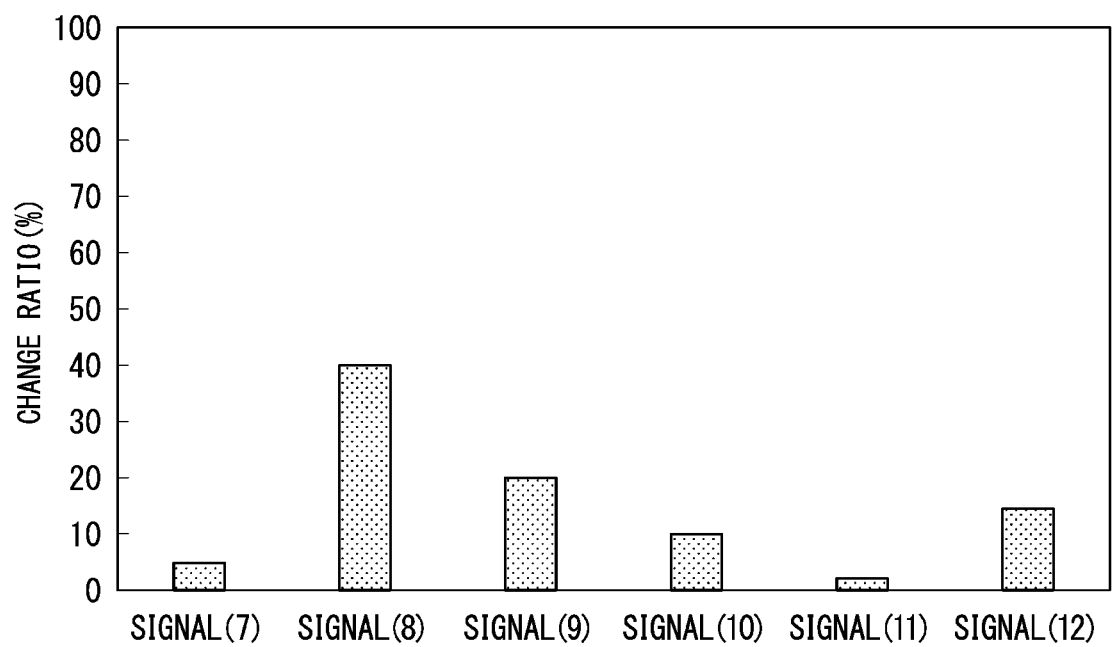
FIG. 8 is a diagram illustrating an example of change ratios of signals in a second group according to the second embodiment.

In the example illustrated in FIG. 7, the change ratio of a signal (2) out of signals (1) to (6) in the first group is increased by 40(%) before and after video information has changed, and the change ratio is equal to or greater than the threshold value and is the highest. In the example illustrated in FIG. 8, the change ratio of a signal (8) in the second group is increased by 40(%), and the change ratio is equal to or greater than the threshold value and is the highest. Accordingly, the extraction unit 92B extracts the signal (2) from the first group and extracts the signal (8) from the second group.

Accordingly, the identification unit 93 identifies items corresponding to the signal (2) and the signal (8) from the adjustment items of the display unit 12, and ascertains the set values thereof. For example, in case that the set value of the adjustment item of the display unit 12 corresponding to the signal (2) is "20" and the set value of the adjustment item of the display unit 12 corresponding to the signal (8) is "10," the adjustment unit 94 calculates adjustment values by applying the change ratios 40(%) of the signal (2) and the signal (8) to the set values. Here, since the adjustment direction which is desired by the user is the plus direction, the adjustment unit 94 adjusts the set value "20" of the adjustment item corresponding to the signal (2) by +40(%) and adjusts the set value "10" of the adjustment item corresponding to the signal (8) by +40(%). That is, the adjustment unit 94 adjusts the set value of the signal (2) to "28" (=20×1.4) and adjusts the set value of the signal (8) to "14" (=10×1.4).

In this way, according to the second embodiment, in case that a user wants to change brightness or chromaticity of a video currently displayed on the display screen and performs selection of the automatic adjustment from the adjustment screen (the menu screen) of the display screen and selection of one of the plus direction and the minus direction as the adjustment direction of the screen, the video display device 2B dynamically adjusts the set value of the screen corresponding to a signal which has changed to most affect the user. That is, in case that a user feels uncomfortable due to change of video information and thus selects the automatic adjustment, the video display device 2B determines signals of which the change ratio before and after video information has changed is the highest in the groups as the reason for the user's discomfort and dynamically adjusts an amount of change thereof. Accordingly, a user does not need to determine an adjustment item which is to be adjusted and which is wanted by the user and a set value of the adjustment item. As a result, it is possible to perform optimal adjustment of a display screen.

A principal configuration of a video display device 2 according to an embodiment of the invention will be described below.

Figure 9:
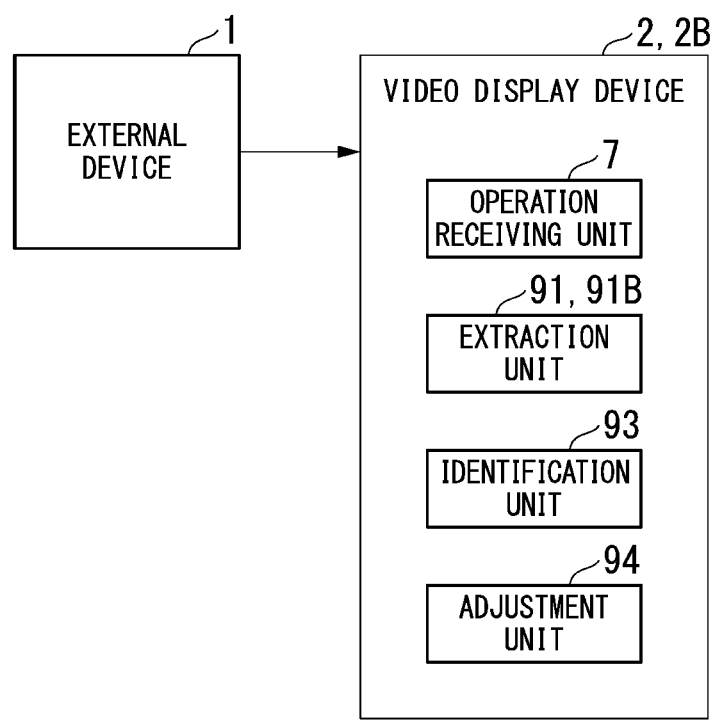
FIG. 9 is a diagram illustrating a principal configuration of a video display device 2 according to an embodiment of the invention.

FIG. 9 is a diagram illustrating a principal configuration of a video display device 2 according to an embodiment of the invention.

As illustrated in FIG. 9, the video display device 2 includes an operation receiving unit 7, an extraction unit 92, an identification unit 93, and an adjustment unit 94.

The operation receiving unit 7 receives an operation.

In case that video information has changed and an operation has been received by the operation receiving unit 7, the extraction unit 92 extracts a signal of which a change ratio in signal value before and after the video information has changed is greater than a threshold value out of various signals.

The identification unit 93 identifies an adjustment item of a display screen corresponding to the signal extracted by the extraction unit.

The adjustment unit 94 adjusts a set value of the adjustment item identified by the identification unit 93.

Accordingly, since the video display device 2 or 2B dynamically adjusts the adjustment value of the screen corresponding to the signal which has most affected a user and which has changed, the user does not need to determine an adjustment item which the user wants to adjust and a set value of the adjustment item. Accordingly, it is possible to perform optimal adjustment of a display screen.

The extraction unit 92 may extract a signal of which the change ratio before and after the video information has changed is greater than a threshold value and which has the greatest change out of various signals.

The video display device according to an embodiment of the invention may further include a classification unit 100. The classification unit 100 classifies a signal affecting brightness of the display screen out of various signals into the first group and classifies a signal affecting color of a video into the second group. The extraction unit 92 (92B) may extract a signal which has most changed in each group.

For example, in case that a signal input to the video display device 2 has changed and it is detected that a user has tried adjustment, the video display device 2 according to an embodiment of the invention may perform a step of detecting a signal difference before and after the video signal has changed, classifying a signal affecting brightness of the screen and a signal affecting color into the first group and the second group, respectively, and determining that a signal having the highest change ratio in each group is the reason why the user adjusts the display screen. The video display device may further include an adjustment means that adds a sign to the highest change ratio and multiplies the set value of the display screen by the change ratio with the sign added thereto after allowing a user to select the desired adjustment direction from the plus direction and the minus direction.

While embodiments of the invention have been described above in detail with reference to the drawings, the specific configuration is not limited to the embodiments and includes a design and the like without departing from the gist of the invention.

For example, in case that it is assumed that an adjustment item in which an adjustment width of the set value ranges from 0 to 100 and in which the current set value is "80" is subjected to adjustment of +40(%), the set value as the result of adjustment is "112." Here, since 100 is the maximum adjustment limit, the adjustment of +40(%) cannot be performed thereon. However, in this embodiment, since change of a signal having the highest change ratio is a reason for a user's discomfort, the video display device according to the embodiment of the invention may set the set value to the maximum value "100" of the adjustment width. In case that there are a plurality of signals of which the change ratio is considered to be the highest in each group, the set values of the adjustment items of all the signals having the highest change ratio may be adjusted.

In the aforementioned embodiments, the video display device 2 uses video information which is being displayed on the display unit 12 as the post-change video information in Step S107 or S207, but the invention is not limited thereto. That is, the post-change video information may not be the video information which is being displayed on the display screen.

For example, the signal processing unit 91 of the video display device 2 may store the current video information and the new video information in the storage unit 10 in case that it is determined that the new video information is different from the current video information in Step S103 or S203. That is, the signal processing unit 91 may store the pre-change video information and the post-change video information in the storage unit 10. In this case, in case that it is determined in Step S107 or S207 that the automatic adjustment of the display screen is applied, the signal processing unit 91 reads the pre-change video information and the post-change video information from the storage unit 10 and compares the read video information.

INDUSTRIAL APPLICABILITY

With the aforementioned video display device, it is possible to perform optimal adjustment of a display screen.

REFERENCE SIGNS LIST

A, B Video display system
1 External device
2, 2B Video display device
7 Operation receiving unit
91 Signal processing unit
92, 92B Extraction unit
93 Identification unit
94 Adjustment unit
100 Classification unit

The invention claimed is:

1. A video display device that acquires video information including various signals required to display a video from an external device and displays a video based on the video information on a display screen, the video display device comprising:
    an operation receiving unit configured to receive an operation;
    an extraction unit configured to extract a signal of which a change in a signal value before and after the video information has changed is greater than a threshold value out of the various signals in case that the video information has changed and the operation is received by the operation receiving unit;
    an identification unit configured to identify an adjustment item of the display screen corresponding to the signal extracted by the extraction unit; and
    an adjustment unit configured to adjust a set value of the adjustment item identified by the identification unit.

2. The video display device according to claim 1, wherein the extraction unit extracts a signal of which the change before and after the video information has changed is greater than the threshold value and which is the greatest out of the various signals.

3. The video display device according to claim 1, the video display device further comprising: a classification unit configured to classify a signal affecting brightness of the display screen into a first group and to classify a signal affecting color of a video into a second group out of the various signals,
   wherein the extraction unit extracts a signal in which the change is the greatest in each group.

4. The video display device according to claim 1,
   wherein the extraction unit extracts a signal of which the change in signal value before and after the video information has changed is greater than a threshold value out of the various signals in case that the operation has been received by the operation receiving unit after the video information has changed.

5. The video display device according to claim 1, the video display device further comprising:
   a storage unit; and
   a signal processing unit configured to store the pre-change video information in the storage unit and to display the post-change video information on the display screen in case that the video information has changed,
   wherein the extraction unit extracts a signal of which a change in signal value between the pre-change video information stored in the storage unit and the video information displayed on the display screen is greater than a threshold value out of the various signals in case that the operation has been received by the operation receiving unit.

6. The video display device according to claim 1, the video display device further comprising:
   a storage unit; and
   a signal processing unit configured to store the pre-change video information and the post-change video information in the storage unit in case that the video information has changed,
   wherein the extraction unit extracts a signal of which a change in a signal value between the pre-change video information and the post-change video information stored in the storage unit is greater than a threshold value out of the various signals in case that the operation has been received by the operation receiving unit.

7. The video display device according to claim 1,
   wherein the adjustment unit adjusts the set value of the adjustment item identified by the identification unit on the basis of a change ratio of the signal extracted by the extraction unit.

8. The video display device according to claim 1, the video display device further comprising: a display control unit configured to display a selection screen for selecting one of a first direction in which the set value increases and a second direction in which the set value decreases on the display screen,
   wherein the adjustment unit adjusts the set value in the direction selected on the selection screen.

9. The video display device according to claim 8,
   wherein the adjustment unit adjusts the set value by multiplying the set value by a value obtained by adding a plus sign to a change ratio of the signal extracted by the extraction unit in case that the direction selected on the selection screen is the first direction and multiplying the set value by a value obtained by adding a minus sign to the change ratio in case that the direction selected on the selection screen is the second direction.

10. A video display method of acquiring video information including various signals required to display a video from an external device and displaying a video based on the video information on a display screen of a video display device, the video display method comprising:
   an operation receiving step of receiving an operation;
   an extraction step of extracting a signal of which a change in a signal value before and after the video information has changed is greater than a threshold value out of the various signals in case that the video information has changed and the operation is received in the operation receiving step;
   an identification step of identifying an adjustment item of the display screen corresponding to the signal extracted in the extraction step; and
   an adjustment step of adjusting a set value of the adjustment item identified in the identification step.

\* \* \* \* \*